United States Patent Office 2,784,193
Patented Mar. 5, 1957

2,784,193
PHENALKYLAMINES

Everett M. Schultz, Ambler, Pa., assignor to Merck & Co., Inc., Rahway, N. J., a corporation of New Jersey No Drawing. Application January 19, 1955,
Serial No. 482,894

4 Claims. (Cl. 260—294.7)

This invention is broadly concerned with alkylene diamine compounds, their salts with acids and quaternary ammonium salts thereof. It is more particularly concerned with novel alkylene diamine derivatives of 1,3-diphenyl-2-propanone and of benzyl phenyl ketone, their salts with acids and the quaternary ammonium salts thereof.

The compounds of this invention can be represented by the general formula

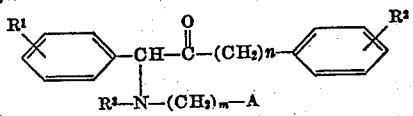

and their acid or quaternary ammonium salts, wherein $R^1$ and $R^2$ are either the same or different and are selected from hydrogen, alkyl, alkoxy or a halogen radical; $R^3$ is hydrogen or a lower alkyl radical; A is a tertiary amino group selected from the dialkylamino or cycloaliphatic-amino group, advantageously a morpholine, piperidine, or pyrollidine radical, or the acid or qauternary ammonium salt of either the dialkylamino or cycloaliphatic-amino group; $n$ is zero or 1; and $m$ is the numeral 2, 3 or 4. The alkyl and alkoxy radicals represented by $R^1$ and $R^2$ are advantageously lower alkyl or lower alkoxy, and the halogen radicals represented by $R^1$ and $R^2$ are advantageously bromine, chlorine or iodine.

The compounds of this invention have utility as therapeutic agents, for example, as local anesthetics or as antifibrillatory agents. Some of the compounds have a very high order of local anesthetic activity and are especially useful for this purpose because they cause little or no irritation to the tissues to which they are applied. The compounds are generally employed in the form of an acid salt or in the form of a quaternary ammonium salt.

The compounds of this invention are advantageously prepared by reacting an appropriate halo ketone (I) with an appropriate alkylene diamine (II) in the presence of an inorganic base or an excess of the alkylene diamine reactant (II). The inorganic base or excess alkylene diamine can, if desired, be provided in order to bind as a halide salt the hydrogen halide formed in the reaction. The process for preparing the novel compounds of this invention can be illustrated as follows:

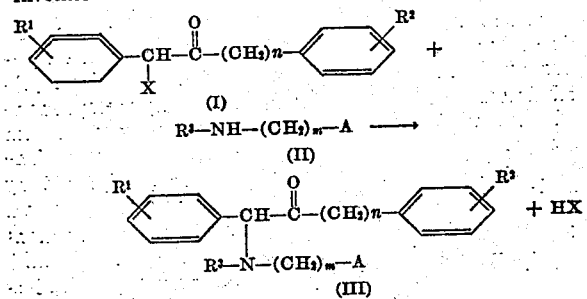

wherein X represents a halogen substituent, preferably chlorine, iodine or bromine. Many inorganic bases are suitable for use in this reaction, some of which are sodium hydroxide, sodium carbonate, potassium hydroxide or potassium carbonate.

The acid salts of the compounds of this invention are prepared by any well-known method as by suspending the diamine (III) in water and adding any desired acid to the mixture until all of the diamine goes into solution. Any acid salt of these compounds can be prepared by this method although for all practical purposes the mineral acid salts such as the hydrochloride, hydrobromine, hydroiodide, hydrogen sulfate or phosphoric acid salt and the like, or organic acid salts such as acetic acid or other relatively non-toxic organic acid salts are preferably prepared by addition of advantageously the anhydrous acid to an ether solution of the base.

The quaternary ammonium salts of the compounds illustrated above can be formed by any of the conventional quaternizing agents such as alkyl halides or aralkyl halides, preferably an alkyl bromide or an alkyl iodide or benzyl chloride or benzyl bromide or a substituted benzyl halide; and alkyl sulfates as methyl sulfate and the like. Advantageously the mineral acid salt of the diamine can be neutralized and the free base isolated and reacted with the desired quaternizing agent suitably in a non-aqueous medium.

As the new compounds of this invention are primarily to be used as therapeutic agents, the salts formed should be such that they will not produce any undesirable toxic manifestations when administered.

The preparation of the compounds of this invention will be described in more detail in the following examples which are illustrative and in nowise limit the procedures by which these compounds can be prepared. All physical constants are uncorrected values.

*Example 1.—1-(β-diethylaminoethylmethylamino)-1,3-diphenyl-2-propanone dihydrochloride*

β-Diethylaminoethylmethylamine (13.6 g., 0.104 mole) was dissolved in ether (20 ml.) and then added slowly with stirring and cooling to a solution of 1-bromo-1,3-diphenyl-2-propanone (15 g., 0.052 mole) dissolved in ether (50 ml.). The mixture was allowed to stand overnight at room temperature after which it was made basic with dilute sodium hydroxide. The mixture then was shaken and the ether layer separated and set aside. The aqueous layer was again extracted with ether and the ether layer removed. The ether solutions were combined and dried over sodium sulfate. The ether then was evaporated and the residue was distilled yielding 1-(β-diethyl-aminoethylmethylamino)-1,3-diphenyl-2-propanone, B. P. 165–170° (at a pressure of 1 mm. Hg). The distillate was taken up in ether and the hydrochloride salt precipitated by the addition of dry hydrogen chloride gas. The precipitate was a gummy, yellow-red, non-crystalline solid which crystallized after standing several days at room temperature. The ether then was decanted and the residue was stirred with hot acetone. The almost colorless precipitate which formed was collected by filtration, M. P. 181–183° C. when placed in bath at 170° C. After two recrystallizations from a mixture of hot isopropyl alcohol and absolute ether there was obtained 7.0 grams of 1 - (β - diethylaminoethylmethylamino) - 1,3-diphenyl-2-propanone dihydrochloride, M. P. 185–186° C.

*Example 2.—1-(β-4-morpholinylethylamino)-1,3-di-m-tolyl-2-propanone dihydrochloride*

By replacing the 1-bromo-1,3-diphenyl-2-propanone and the β-diethylaminoethylmethylamine employed in Example 1 by an equimolecular quantity of 1,3-di-m-tolyl-2-propanone and β-4-morpholinylethylamine respectively, and following substantially the same procedure described in Example 1, there is obtained 1-(β-4-morpholinylethyalmino)-1,3-di-m-tolyl-2-propanone dihydrochloride.

*Example 3.—1-(β - 1 - pyrrolidylethylmethylamino)-1,3-di-o-bromophenyl-2-propanone dihydrochloride*

By replacing the 1-bromo-1,3-diphenyl-2-propanone and the β-diethylaminoethylmethylamine employed in Example 1 by an equimolecular quantity of 1,3-di-o-bromophenyl-2-propanone and β-1-pyrrolidylethylmethylamine respectively, and following substantially the same procedure described in Example 1, there is obtained 1-(β-1-pyrrolidylethylmethylamino)-1,3-di - o - bromophenyl-2-propanone dihydrochloride.

*Example 4.—α-(β-Diethylaminoethylmethylamino)-α-phenylacetophenone dihydrochloride*

Desyl chloride (4.6 g., 0.02 mole) was mixed with β-diethylaminoethylmethylamine (2.6 g., 0.02 mole) without solvent and the mixture was allowed to stand at room temperature. Considerable heat was evolved and a clear orange solution resulted. After thirty minutes, water (50 ml.) and concentrated hydrochloric acid (10 ml.) were added. The insoluble oil which formed was extracted with ether and discarded. The aqueous solution then was made basic, and the α-(β-diethylaminoethylmethylamino)-α-phenylacetophenone was taken up in ether, washed four times with water and dried over sodium sulfate. The hydrochloride salt of the bis-tertiary amine was precipitated by passing in dry hydrogen chloride gas. The salt precipitated as a gum which crystallized after lengthy rubbing under ether yielding 4.0 g. of crude α-(β-diethylaminoethylmethylamino)-α-phenylacetophenone dihydrochloride, M. P. 210–220° C. After two recrystallizations from isopropyl alcohol, and an additional recrystallization from ethanol, 1.5 g. of purified α-(β-diethylaminoethylmethylamino) - α - phenylacetophenone dihydrochloride was obtained, M. P. 213–215° C. (with decomposition).

*Example 5.—α-(δ-4-morpholinylbutylmethylamino)-α-(o-bromophenyl)-o-bromoacetophenone dihydrochloride*

By replacing the desyl chloride and the β-diethylaminoethylmethylamine employed in Example 4 by an equimolecular quantity of o,o'-dibromodesoxybenzoin and δ-4-morpholinylbutylmethylamine respectively, and following substantially the same procedure described in Example 4, there is obtained α-(δ-4-morpholinylbutylmethylamino)-α-(o-bromophenyl) - o - bromoacetophenone dihydrochloride.

*Example 6.—α - [β - (1-piperidyl)ethylmethylamino]-α-phenylacetophenone dihydrochloride*

Desyl chloride (23.1 g., 0.1 mole) was mixed with β-(1-piperidylethyl)-methylamine (14.2 g., 0.1 mole) without solvent and the mixture was allowed to stand. The reaction proceeded with evolution of heat yielding a clear yellow solution within five minutes. The mixture was allowed to stand an additional two hours, after which water (150 ml.) and concentrated hydrochloric acid (20 ml.) were added. The insoluble oil which formed was extracted with ether and discarded. The aqueous solution was made basic, and the α-[β-(1-piperidyl)ethylmethylamino]-α-phenylacetophenone that separated was taken up in ether, washed three times with water and dried over sodium sulfate. The hydrochloride salt was precipitated by passing dry hydrogen chloride gas into the ether solution of the amine. The salt was triturated with acetone, whereupon a poorly crystalline material was obtained. This crystalline material was dissolved in a mixture of isopropyl alcohol (300 ml.) and water (3 ml.) and precipitated by the addition of ether (100 ml.). After two additional recrystallizations from a mixture of isopropyl alcohol (78 ml.) and ethanol (35 ml.) there was obtained 9.5 g. of α-[β-(1-piperidyl)ethylmethylamino]-α-phenylacetophenone dihydrochloride, M. P. 207–209° C. (with decomposition).

*Example 7.—α - [β - (1-piperidyl)ethylmethylamino]-α-(p-methoxyphenyl)-p - methoxyacetophenone dihydrogen sulfate* p,p-Methoxydesyl chloride (14.6 g., 0.05 mole), β-(1-piperidylethyl)-methylamine (7.1 g., 0.05 mole) and potassium carbonate (6.9 g., 0.05 mole) were mixed and allowed to stand for three hours at room temperature. The reaction proceeded with the evolution of heat yielding a pasty mass. Water and sufficient concentrated hydrochloric acid were added to make the mixture acidic. The insoluble oil which formed was extracted with ether and discarded. The aqueous solution was made basic, whereupon α-[β-(1-piperidyl)ethylmethylamino] - α - (p-methoxyphenyl)-p-methoxyacetophenone separated. The precipitated amine was taken up in ether and dried over sodium sulfate. The sulfate salt was prepared by adding concentrated sulfuric acid to the ether solution of the amine until the mixture was just acidic. The sulfate salt separated as a gum which crystallized when rubbed under acetone. After three recrystallizations from a mixture of ethanol (150 ml.) and water (5 ml.) there was obtained 7.7 g. of α-[β-(1-piperidyl)ethylmethylamino]-α-(p - methoxyphenyl)-p-methoxyacetophenone dihydrogen sulfate, M. P. 205–206° C.

*Example 8.—α-(β-Diethylaminoethylmethylamino)-α-phenyl-p-methylacetophenone dihydrochloride*

α-Bromobenzyl p-methylphenyl ketone (14.4 g., 0.05 mole) was dissolved in ether (100 ml.), and potassium carbonate (6.9 g., 0.05 mole) was added. β-Diethylaminoethylmethylamine (6.5 g., 0.05 mole) was added dropwise over a period of ten minutes with stirring to the solution of the bromo ketone. The mixture then was allowed to stand two hours at room temperature, after which 10% hydrochloric acid (150 ml.) was added. The ether layer was separated and discarded. The aqueous layer was made basic, and the amine which precipitated was separated and then taken up in ether, washed with 5 portions of water and dried over sodium sulfate. The dihydrochloride salt was precipitated by passing dry hydrogen chloride gas into the ether solution. The crystalline precipitate was twice recrystallized from a mixture of isopropyl alcohol (125 ml.) and water (16 ml.) yielding 7.4 g. of α-(β-diethylaminoethylmethylamino)-α-phenyl-p-methylacetophenone dihydrochloride, M. P. 227° C. (with decomposition).

*Example 9.—α - [β - (1-piperidyl)ethylmethylamino]-α-phenyl-p-methylacetophenone dihydrochloride*

α-Bromobenzyl p-methylphenyl ketone (20.2 g., 0.07 mole) was dissolved in ether (175 ml.), and potassium carbonate (9.7 g., 0.07 mole) was added. β-(1-piperidylethyl)-methylamine (10 g., 0.07 mole) was added in portions over a ten minute period with stirring. The mixture was allowed to stand at room temperature for two hours, after which water (200 ml.) and concentrated hydrochloric acid were added to make the aqueous layer acidic. The ether layer was separated and discarded. The aqueous layer then was made basic and the α-[β-(1-piperidyl)ethylmethylamino] - α - phenyl - p - methylacetophenone which precipitated was taken up in ether, washed with five portions of water and dried over sodium sulfate. The dihydrochloride salt of the amine was precipitated by passing hydrogen chloride gas into the dried ether solution. The salt was separated and after three recrystallizations from a mixture of ethanol (100 ml.) and ether (100 ml.) yielded 8.3 g. of α-[β-(1-piperidyl)ethylmethylamino]-α-phenyl-p-methylacetophenone dihydrochloride, M. P. 224–225° C. (with decomposition).

*Example 10.—α-(β-Diethylaminoethylmethylamino)-α-(p-methoxyphenyl) - p - methoxyacetophenone dihydrochloride.* p,p′-Dimethoxydesyl chloride (17.5 g., 0.06 mole), β-diethylaminoethylmethylamine (8.5 g., 0.06 mole) and potassium carbonate (8.3 g., 0.06 mole) were mixed and allowed to stand two hours at room temperature, after which 200 ml. of water was added and sufficient concentrated hydrochloric acid to make the solution acidic. The insoluble material which formed was extracted with ether, and the ether extract was discarded. The aqueous solution was made basic, and the α-(β-diethylaminoethylmethylamino) - α - (p - methoxyphenyl) - p - methoxyacetophenone which was liberated was taken up in ether, washed with four portions of water and dried over sodium sulfate. The dihydrochloride salt of the amine was precipitated by bubbling dry hydrogen chloride gas into the ether solution. The salt crystallized after considerable rubbing. After two recrystallizations from ethanol, 9.7 g. of α-(β-diethylaminoethylmethylamino)-α-(p-methoxyphenyl)-p-methoxyacetophenone dihydrochloride was obtained, M. P. 213° C. (with decomposition).

*Example 11.—α-(β-Diethylaminoethylmethylamino) - α-phenyl-p-chloroacetophenone dihydrochloride*

α-Bromobenzyl p-chlorophenyl ketone (15.6 g., 0.05 mole) was dissolved in ether (100 ml.). Potassium carbonate (6.9 g., 0.05 mole) was added, and then β-diethylaminoethylmethylamine (6.5 g., 0.05 mole) was added in portions with swirling over a fifteen-minute period. The mixture was allowed to stand 1½ hours at room temperature, during which time some heat was evolved. Water (150 ml.) was added to the mixture, and sufficient concentrated hydrochloric acid was added to make the mixture acidic. The ether layer was separated and discarded. The aqueous solution was made basic, and the α-(β-diethylaminoethylmethylamino)-α-phenyl-p-chloroacetophenone which was liberated was taken up in ether and dried over potassium carbonate. The dihydrochloride salt of the amine was precipitated by bubbling dry hydrogen chloride gas into the ether solution. The salt quickly crystallized. After one recrystallization from a mixture of ethanol (75 ml.) and water (4 ml.) and an additional recrystallization from a mixture of methanol (15 ml.) and ethanol (50 ml.), 6.2 g. of α - (β - diethylaminoethylmethylamino) - α - phenyl-p-chloroacetophenone dihydrochloride was obtained, M. P. 218–219° C. (with decomposition).

*Example 12.—α - (Gamma - 1 - piperidylpropylmethylamino) - α - phenyl - p - methylacetophenone dihydrochloride*

Potassium carbonate (9.7 g., 0.07 mole) was added to a solution of α-bromobenzyl p-methylphenyl ketone (17.3 g., 0.06 mole) in ether (150 ml.). To this solution, gamma - 1 - piperidylpropylmethylamine (11 g., 0.066 mole) was added in portions over a fifteen-minute period. Some heat was evolved. The mixture was allowed to stand one hour, after which water (200 ml.) was added and then concentrated hydrochloric acid (25 ml.). The ether layer was separated and discarded. The aqueous layer was made basic and the α-(gamma-1-piperidylpropylmethylamino) - α - phenyl - p - methylacetophenone which separated was taken up in ether, washed five times with water and dried over sodium sulfate. The dihydrobromide salt of the amine was prepared by adding 48% aqueous hydrogen bromide to the ether solution until it became acidic. The salt precipitated as an orange oil. The ether was decanted and the residual oil dissolved in acetone (200 ml.). Ether (approximately 50 ml.) was added to incipient precipitation. The salt gradually crystallized out at room temperature. After one recrystallization from a mixture of isopropyl alcohol (40 ml.) and methanol (40 ml.), 10.5 g. of α-(gamma-1-piperidylpropylmethylamino) - α - phenyl - p - methylacetophenone dihydrochloride, M. P. 225–227° C. was obtained.

*Example 13.—1 - (gamma - 1 - piperidylpropylmethylamino) - 1,3 - diphenyl - 2 - propyl - propanone dihydrochloride*

1 - Bromo - 1,3 - diphenyl - 2 - propanone (8.7 g., 0.03 mole), gamma-1-piperidylpropylmethylamine (9.4 g., 0.06 mole), and ether (100 ml.) were mixed and allowed to stand one hour at room temperature. Heat was evolved immediately. Water (200 ml.) and concentrated hydrochloric acid (25 ml.) were added, and the ether layer which separated was discarded. The aqueous layer was made basic and the 1-(gamma-1-piperidylpropylmethylamino) - 1,3 - diphenyl - 2 - propyl - propanone which precipitated was taken up in ether, washed five times with water and dried over sodium sulfate. The hydrochloride salt of the amine was obtained by bubbling dry hydrogen chloride gas into the dried ether solution. The salt crystallized when rubbed with acetone. After one recrystallization from a mixture of isopropyl alcohol (30 ml.) and ether (35 ml.) and a second recrystallization from a mixture of acetone (30 ml.) and ethyl alcohol (12 ml.), 5.0 g. of 1 - (gamma - 1 - piperidylpropylmethylamino) - 1,3 - diphenyl - 2 - propylpropanone dihydrochloride, M. P. 128–131° C., was obtained.

*Example 14.—α - (β - Diethylaminoethylamino) - α - phenyl - p - chloroacetophenone dihydrochloride*

α-Bromobenzyl p-chlorophenyl ketone (11.0 g., 0.0354 mole), β-diethylaminoethylamine (8.1 g., 0.07 mole) and ether (100 ml.) were mixed and allowed to stand one hour at room temperature. The reaction occurred very rapidly with the evolution of heat. A 5% hydrochloric acid solution (150 ml.) then was added, and the ether layer which separated was removed and discarded. The aqueous layer was made basic, and the α-(β-diethylaminoethylamino) - α - phenyl - p - chloroacetophenone which separated was taken up in ether, washed five times with water and dried over sodium sulfate. The dihydrochloride salt of the amine was prepared by passing dry hydrogen chloride gas through the dried ether solution. The salt precipitated as a gum. The ether was decanted, and the gum was rubbed under acetone (200 ml.), whereupon it crystallized. After one recrystallization from a mixture of isopropyl alcohol (50 ml.) and water (4 ml.) and a second recrystallization from a mixture of isopropyl alcohol (20 ml.) and methanol (15 ml.), 2.4 g. of α - (β - diethylaminoethylamino) - α - phenyl - p-chloroacetophenone dihydrochloride was obtained, M. P. 204–207° C. (with decomposition).

*Example 15.—α - (β - Diethylaminoethylmethylamino)-α - phenylacetophenone methobromide*

α- (β - Diethylaminoethylmethylamino) - α - phenylacetophenone dihydrochloride (7.9 g., 0.02 mole), obtained as described in Example 4, was decomposed with aqueous sodium hydroxide to yield the free base. The free amine was taken up in ether, dried over sodium sulfate, and liquid methyl bromide (1.9 g., 0.02 mole) was added. The mixture was allowed to stand at room temperature, and an oily salt quickly separated. The ether was decanted and the thus obtained α-(β-diethylaminoethylmethylamino) - α - phenylacetophenone methobromide was dried in an air stream.

*Example 16.—α - (β - Diethylaminoethylmethylamino)-α - (p - methoxyphenyl) - p - methoxyacetophenone methobromide*

α - (β - Diethylaminoethylmethylamino)-α-p-methoxyphenyl)-p-methoxyacetophenone dihydrochloride (4.6 g., 0.01 mole), obtained as described in Example 10, was decomposed with aqueous sodium hydroxide to form the free base. The free amine was taken up in ether, dried over sodium sulfate, and liquid methyl bromide (1.0 g., 0.01 mole) was added. An oily quaternary ammonium salt quickly separated. The ether was decanted, and the oily residue was dried in an air stream.

*Example 17.—1-(β-diethylaminoethylmethylamino) - 1,3-diphenyl-2-propanone diacetate*

1-(β-diethylaminoethylmethylamino) - 1,3-diphenyl-2-propanone (0.01 mole), prepared as described in Example 1, was taken up in ether and glacial acetic acid (0.02 mole) was added. The solution was allowed to stand several hours at room temperature, after which the ether was removed by evaporation yielding 1-(β-diethylaminoethylmethylamino)-1,3-diphenyl-2-propanone diacetate.

While the invention has been illustrated by certain specific compounds and certain specific methods for this preparation, it is to be understood that variations and modifications can be made in each of them without departing from the scope of the invention.

What is claimed is:

1. An alkylene diamine compound selected from compounds having the structural formula

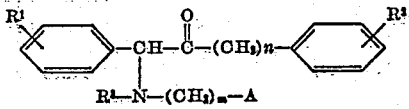

their acid salts and quaternary ammonium salts, wherein $R^1$ and $R^2$ are selected from the group consisting of hydrogen, lower alkyl, lower alkoxy and halogen radicals; $R^3$ is selected from the group consisting of hydrogen and lower alkyl radicals; A is a tertiary amino group selected from the group consisting of a lower dialkylamino group and a morpholinyl, a pyrrolidyl and a piperidyl group; n is a numeral selected from zero and one; and m is a numeral selected from 2, 3 and 4.

2. α-(β-Diethylaminoethylmethylamino) - α - phenyl-p-chloro-acetophenone dihydrochloride.

3. α-(γ-1-Piperidylpropylmethylamino) - α - phenyl-p-methyl-acetophenone dihydrochloride.

4. 1-(γ-1-Piperidylpropylmethylamino) - 1,3-diphenyl-2-propanone dihydrochloride.

No references cited.